United States Patent [19]

Tuomi

[11] Patent Number: 4,677,806
[45] Date of Patent: Jul. 7, 1987

[54] WOODEN BUILDING SYSTEM WITH FLANGE INTERLOCK AND BEAMS FOR USE IN THE SYSTEM

[75] Inventor: Roger L. Tuomi, Madison, Wis.

[73] Assignee: The United States of America as represented by the Secretary of Agriculture, Washington, D.C.

[21] Appl. No.: 848,175

[22] Filed: Apr. 4, 1986

[51] Int. Cl.⁴ .............................................. E04C 3/11
[52] U.S. Cl. ...................................... 52/656; 52/690; 52/642; 52/729; 403/382
[58] Field of Search ............... 52/642, 729, 79.7, 79.1, 52/648, 93, 645, 648, 643, 639, 656; 403/382, 403

[56] References Cited

U.S. PATENT DOCUMENTS

| | | | |
|---|---|---|---|
| 1,911,413 | 5/1933 | Wait | 52/729 |
| 2,230,628 | 2/1941 | Sahlberg | 52/729 |
| 2,886,857 | 5/1959 | Brosenius | 52/93 |
| 2,967,332 | 1/1961 | Donlin | 52/642 |
| 3,039,152 | 6/1962 | Hillesheim | 52/642 |
| 3,263,381 | 8/1966 | Dickinson | 52/90 |
| 3,791,082 | 2/1974 | Bowling | 52/90 |
| 3,866,371 | 2/1975 | Falconer | 52/648 |
| 4,413,459 | 11/1983 | Lambuth | 52/729 |
| 4,483,114 | 11/1984 | Cox | 52/729 |
| 4,488,390 | 12/1984 | Mulford | 52/729 |

FOREIGN PATENT DOCUMENTS

| | | | |
|---|---|---|---|
| 667922 | 8/1963 | Canada | 52/729 |
| 2307459 | 9/1973 | Fed. Rep. of Germany | 52/729 |
| 77818 | 12/1950 | Norway | 52/729 |
| 247390 | 12/1947 | Switzerland | 52/642 |
| 89 | of 1913 | United Kingdom | 52/642 |

Primary Examiner—John E. Murtagh
Attorney, Agent, or Firm—M. Howard Silverstein; David G. McConnell

[57] ABSTRACT

A joint for use in building construction which is dependent upon beams made of wood, metal or related materials. The beams may be box beams or I-beams. In each case, the beams are made up of webs and flanges. The flanges may be of wood and of various different shapes. The joints are formed by cutting away the flanges and webs as necessary so that the beams will fit together in a continuous manner, that is, with the flanges and webs continuing without interruption across the joint. The joints can then be fixed together using conventional means such as nails, screws, adhesives and the like.

17 Claims, 22 Drawing Figures

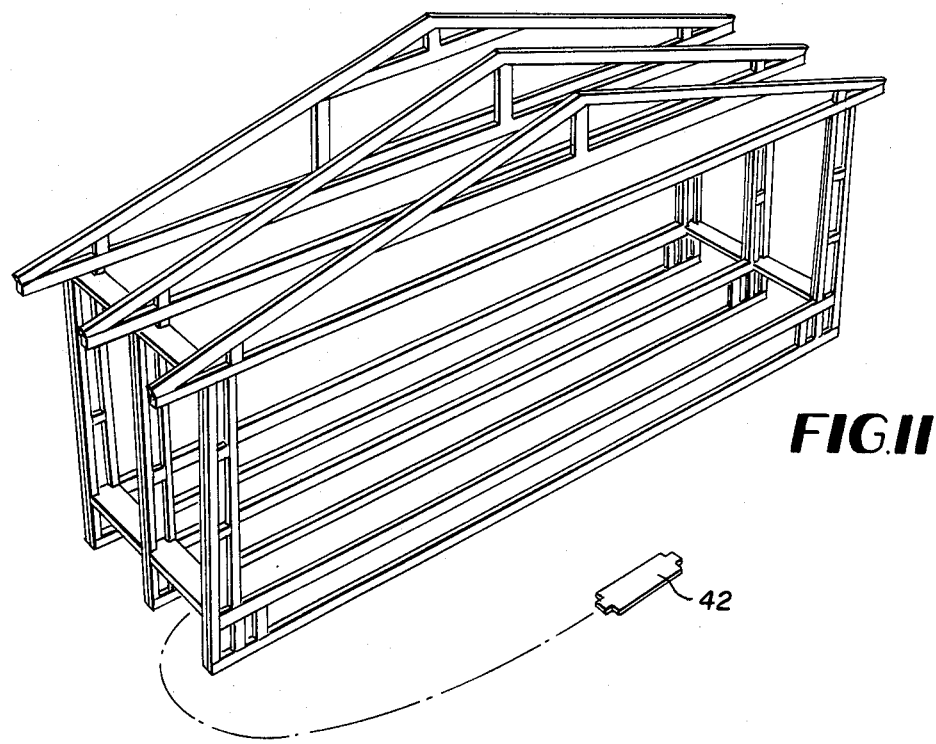
FIG.11
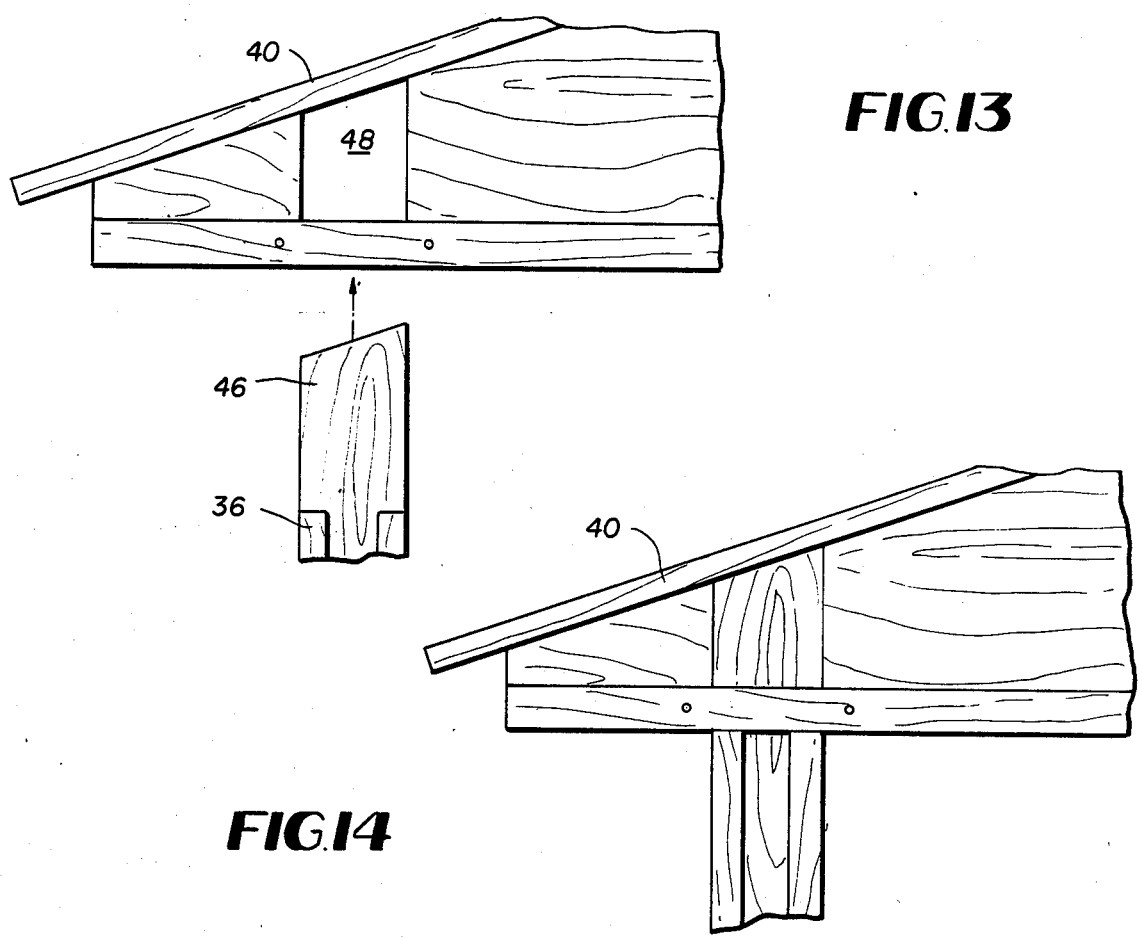
FIG.13
FIG.14

OPEN

CLOSED

WOODEN BUILDING SYSTEM WITH FLANGE INTERLOCK AND BEAMS FOR USE IN THE SYSTEM

FIELD OF THE INVENTION

This invention relates to construction methods, using wood and other materials, and particularly to such methods as applied to residential and other such light construction buildings.

BACKGROUND OF THE INVENTION

Wood, as currently used, is becoming an increasingly scarce and more expensive construction raw material. As the so-called "old growth" forest in the USA is consumed, it becomes necessary to use smaller and lower quality trees and lumber as the primary wood source for construction purposes. Failure to recognize this reality will result in wood as a construction material as now being used to disappear. That is, it is highly likely that wood will be either not available or economically unattractive in future years as it is currently used in large lumber sizes. The present invention provides a novel construction system which can utilize the smaller and lower grade sizes and qualities of wood in construction.

SUMMARY OF THE INVENTION

The invention system does not depend upon the present large sizes of lumber as currently used in construction. The invention rather uses a beam member, either an I-beam or a box beam or other standard beam constructions. In any event, the invention beams are built up from two basic elements, the flange and the web. Typically, the flanges are made of small sizes of solid wood, whereas the webs may made of various sorts of reconstituted wood, such as particleboard or plywood or the like.

Another important advantage of the invention pertains to the manner in which these beams are joined together. Several embodiments of this joining method are disclosed. In all cases, the invention system interlocks the three normal components of the building, the walls, the floor and the ceiling/roof into a utilized frame through the use of the joints of the invention which produce a structural continuity among all three of the wall, floor and roof.

The joining system comprises providing that the web or webs of a component extends into or adjacent to the flange or flanges of the component to which it joins. In this way, a continuity of both the flanges and the webs are provided through the joint. That is, a part of at least one surface of a web on one of the beams is attached to a flange on the other beam. As used herein, the term "surface" refers to the planar surfaces of the web, not the edge or edges of the web. Once assembled, the joint can be fixed together in any normal fashion, such as by the use of nails, glue, screws, or any combination thereof, to thereby provide structural continuity through the entire assemblage.

Thus, the joint may be described as comprising first and second members or beams, each of said members comprising at least one web and a plurality of flanges, wherein part of said first member's web longitudinally extends beyond at least one flange of said first member at said joint to define an extended web segment, wherein said extended web segment is connected to at least one flange of said second member at said joint, and wherein the connection is at points across said segment's substantially entire width.

The extended web segment of the first member or beam may be described as coplanar and at least nearly butting with the second member's web at the joining. As used in the specification and claims, the term "coplanar" refers to the fact that the extended web segment of the first member in essence replaces a missing or cut-out segment of the web in the second member thereby making the extended web segment coplanar with the web of the second member at the joint.

As will be seen in the more detailed description of the invention, in most instances, the width of the extended web segment of the first member or beam is about the width of its respective web.

Within this broad context, several configurations are possible for each of the mating components on the beam members. For example, in the case of I-beams, the extended web segment may be connected to one or two flanges on the mating member in slots therein; the flanges on a member may be of different lengths, and the extending web segment may extend beyond one or both flanges; both members may have flanges of different lengths, wherein the shorter flange on one member butts against the shorter flange on the other member, while the longer flange on the latter member butts against the longer flange of the former; and the member with the extended web segment may have flanges of equal length both of which butt against one of the flanges on the mating member.

Describing the invention in another way, where I-beams are used, the flanges may be left off one component for a distance equal to the depth of the beam to which it joins. On the adjoining component, the web may be omitted for a distance equal to the depth of the other component, but the flanges remain intact. In this manner, continuity of both webs and flanges through the joint is provided.

In this latter embodiment, joining is accomplished by inserting the extending web into a slot between the flanges of the companion component until the flanges of the two pieces make contact. This signifies to the workman that the joint is fully closed. Fixing together of the joint can then be done as described above.

As an alternative to slots in the flanges, grooves are provided in the flanges to receive the web of the adjacent mating member. In this case, the extending webs will be made slightly longer in order to accomodate the extra extension of the webs. Further, this requires minimal secondary processing to prepare the grooves, which may be simply routed in high speed commercially produced I-beams embodying the invention.

Where box beams are used, the joining principle is conceptually the same. However, the webs of one component would straddle the flanges of the adjoining component. It is required that the flanges of the two components be of the same width.

Another variation of the invention is that the entire length of the beam need not be of box beam configuration. It is only required that the ends where joining is accomplished be formed in this manner. For example, an open web beam would require side plates only at the extreme ends to make a connection with the adjoining component in accordance with the teaching of the invention.

Another advantage of I-beams in accordance with the invention is that connection can be made regardless of the size or shape of the flange elements. The flange elements themselves can be of any configuration, rectangular, triangular, circular or any part thereof, or even random. This is especially important where timber supplies are limited to small trees, as more material can be recovered from the limited number of trees if there is great versatility as to the shape required for the relatively small pieces needed for the flanges of the beams embodying the invention. In this kind of a configuration, the primary requirement would be that the web elements of the fitting together components be of equal thickness, and these web components will typically be factory produced from reconstituted wood. Thus, the webs would, because of their factory production, have high dimensional integrity as well as uniform physical characteristics.

Metal I-beams, box beams, and various girders built up of smaller elements have been known for over 150 years. The same concepts have been applied to wood since the advent of plywood about 50 years ago. Still more recently, advances have been made in fabricating wooden I-beams at high speed. Such beams can be produced at speeds in excess of 250 feet per minute, with a corresponding decline in unit cost as production rates rise.

The present invention can take advantage of these advances in the field in that standard wooden I-beams can be used, modification is required only at the ends. This is of course in addition to the inventions use with I-beams having flanges of various different sorts of shapes or even irregular shapes.

The invention has substantial versatility, and this versatility is utilized in building the different kinds of members that are required for residential and light commercial building construction.

In roofs, long spans are needed. Typically, these are flat or fabricated with a slight taper to provide for drainage. It is envisioned that the invention system would utilized a configuration different from that used in a conventional wood I-beam. This difference would be primarily for appearance and better drainage. Since it is expected that the invention system will be used for residential construction, roof slopes of 3 in 12, 4 in 12, or greater would be needed to retain the appearance of conventional construction. Also, slopes of 3 in 12 or greater are recommended if standard roof shingles are to be used.

This different configuration would change the design of the roof components somewhat. It might take the form of two functional elements, primary and secondary structural elements. The primary structural portion would provide the structural integrity to support the full design roof load. The secondary portion would only need to support the added structural elements that provide the shape to the roof.

The connections between roof and walls with the invention system would be slightly different than the invention system as applied to the joints between floor and walls. The web of the wall beam would extend into a pocket designed at the heel of the roof component or truss. The structural continuity and moment carry over would be the same as or better than conventional construction.

In wall construction, at the present time, I-beams are little used if at all as substitutes for solid wood studs. With conventional light frame construction, there is no compelling economic reason not to use solid studs as the economics are at the present time. In fact, added difficulties may be encountered if an attempt were made to fasten I-beams to top and bottom plates rather than to conventional studs.

The present invention overcomes this problem. I-beams are provided in the walls to thus anticipate future problems with solid wood members. Further, the I-beam studs when used as an integral and essential component of the invention system provides numerous economic and functional advantages over conventional construction.

I-beam studs can be fabricated to any desired depth and are not restricted to standard widths, which is the case with standard solid wood lumber. However, for the purpose of using standard dimension lumber for headers, sills, spacer blocks, and the like, it is desirable to select a depth for the invention components compatible with dimension lumber to the extent that such standard dimension lumber is used in construction in conjunction with the invention system.

Another advantage of the invention I-beam stud as used in walls is that it can, by itself, resist horizontal loads. Such loads are produced by wind forces, seismic upheavals, and the like. Conventional solid studs must rely upon structural sheathing and interior partitions to carry such loads. Thus, the invention provides an advantage in that walls built with the invention's I-beams studs are stronger than walls built with conventional solid wood studs.

Another advantage flowing directly from this added strength is that the walls, since they are joined integrally with the floor, can result in the depth of the floor beams being reduced, thus effecting economic advantages in floor construction.

The invention I-beam stud provides an added advantage in that it naturally lends itself to production of super insulated walls. Further, in addition to providing improved insulation, the invention system can also correct many of the problems in present construction practices, which problems result from efforts to improve the energy efficiency of walls.

For many years, walls were built with structural sheathing on the outside. This sheathing in past years consisted of boards, so called clap boards, and the walls consequently had little if any insulation value. Later, labor-saving, full-sized sheet products replaced this board sheathing, but the practice of applying the sheathing to the outside of the walls continued. The next development which resulted from energy shortages in recent years, was that the cavities of the walls were stuffed with insulation, and steps were taken to reduce the infiltration of air through the walls. Finally, boards formed of plastic foam, which have excellent thermal properties, were incorporated into wall construction for housing. The end result is that moisture build up might occur inside the wall cavities, thus greatly reducing the effectiveness of the insulation, and in addition creating a dangerous environment conducive to decay and vermin.

Structural sheathing and foamed plastic boards are both good vapor retarders. However, by being placed on the outside surface they tend to trap moisture inside the wall cavities. Thus, it appears that both products are being used of the wrong surface of the wall considering the thermal situation and the moisture trapping problem. That is, they are installed inside out from the energy perspective.

There were attempts made to apply the plastic foam boards on the inside of the wall, but the dry wall trades, the workers applying gypsum boards (dry wall) to the inside for finishing purposes, objected quite vigorously because the foam boards made their work more difficult. This resulted in the foam boards being applied to the outside surface of the wall. Since the plastic foam boards are not structural, they cause the nails that secure the exterior siding to the building to cantilever out of the stud a distance equal to the thickness to the plastic foam board. Nails cannot function effectively in this manner, and problems are now arising with dimensional stability of the exterior siding built in that manner.

The invention I-beam studs solve all of these problems by providing the insulation on the inside rather than the outside, and overcome all of these problems while achieving new advantages.

The invention system when applied to such thermal walls provides the advantages of a double vapor retarder on the warm surface to minimize vapor escaping through the wall cavity; includes a dead air space between the vapor retarder to enhance energy performance and protect the second retarder; permits the placement of the plastic foam board in a location where it cannot be damaged or interfer with the performance of the structural elements of the building; incorporates reflective insulation to reduce heat loss through radiation; increases the wall depth to accommodate additional thickness of conventional insulation material such as blankets of fiberglass or the like; reduces the heat loss through the thermal bridge effect by a substantial factor; and reduces the potential for vapor transmission into the wall cavity.

ADVANTAGES OF THE PRESENT INVENTION WITH RESPECT TO THE PRIOR ART

The invention has enormous economic advantages and additional advantages pertaining to efficient utilization of available wood resources. The basic element of the invention system can be produced from small sizes of wood and from low quality materials, which low quality materials might have little if any other economic usefulness. The flanges can be made from the trees without processing the trees into standard dimensional sizes of lumber. The webs can be produced from a wide variety of reconstituted wood fibers. Oriented strandboard which is being produced from low quality species, such as gum, throughout the country is a likely candidate for use in the production of webs for use in the invention system.

The invention provides enormous design flexibility. The designer is given freedom to use a wider range of materials and material properties, and the component size, shape and depth can be made to vary without limitation to accommodate all material variables as well as design parameters of the building.

Another facet of the invention's flexibility has to do with flexibility in fabrication. Invention system components can be fabricated with simple nailing and gluing procedures not requiring any capital investment for use in small markets. At the other extreme, the invention system is amendable to high speed automatic production for mass markets. The invention system is also applicable to production using machinery for making such members which is already in operation.

Yet another advantage of the invention has to do with the structural integrity of the building produced. The joint interlock feature of the invention causes all components to share forces applied to any one of them. Smaller members can result from this load sharing capability, for example, the floor can be made shallower as discussed above. In addition, the positive connections and load sharing between the floor and roof members provide greater safety against natural disasters such as hurricanes and earthquakes.

A further advantage has to do with the speed of erection. It is anticipated that an entire house can be framed up in less than two hours using the invention system. Thus, delays due to bad weather are minimized, interest on construction loans is reduced, the homeowner gets his home finished sooner, and many other advantages flow from this speed.

A further advantage has to do with the improved energy wall produced by the invention system as discussed above.

Yet a further advantage has to with ease of transportation. Components according to the invention system can be nested and shipped in very compact packages. It is anticipated that sufficient components for four houses can be transported on a single large truck. The components themselves are fairly light, it is estimated that the components required to build a single house will weigh on the order of six thousand pounds. With this in mind, such a set of components could even be transported by helicopter to remote locations. In other environments, the invention lends itself to having the frames shipped fully assembled if desired or required.

Yet another advantage has to do with the simplicity of assembly. Invention system components are delivered to the site ready to assemble. No on-site fabrication, cutting or layout is needed. The assembly operation is simply sliding the mating pieces together and securing them at the joints. A hammer, screw driver, gluing equipment or the like is all the tools required by the on-site construction personnel.

A related advantage has to do with the ability to utilize less skilled labor. Because of the inherent simplicity of the invention system, apprentice or even lower skills are all that is required, and prior experience is unnecessary. This advantage works together with the advantage of quick construction to lead to very substantial cost-savings over conventional "stick-by-stick" construction methods.

The invention system provides relatively wide contact surfaces. These wide flanges are an advantage for subsequent construction procedures. Greater error can be tolerated where sheathing or panel products meet at a common joint. This is particularly important when automatic nailing devices are used to put up the finishing sheaths. Stronger connections result when adhesive are used, such adhesives are a well developed technology in and of themselves.

BRIEF DESCRIPTION OF THE DRAWING

The invention will be better understood with reference to accompanying drawing, also forming a part of this disclosure, wherein:

FIG. 11 is a view similar to FIG. 10 but in perspective and showing a series of such vertical sections joined together;

FIG. 13 is an exploded view showing the juncture of the ceiling and wall beams of FIGS. 9–11;

FIG. 14 is a view similar to FIG. 13 showing the parts in assembled together configuration;

DETAILED DESCRIPTION OF THE PREFERRED EMBODIMENTS

Figure 1:
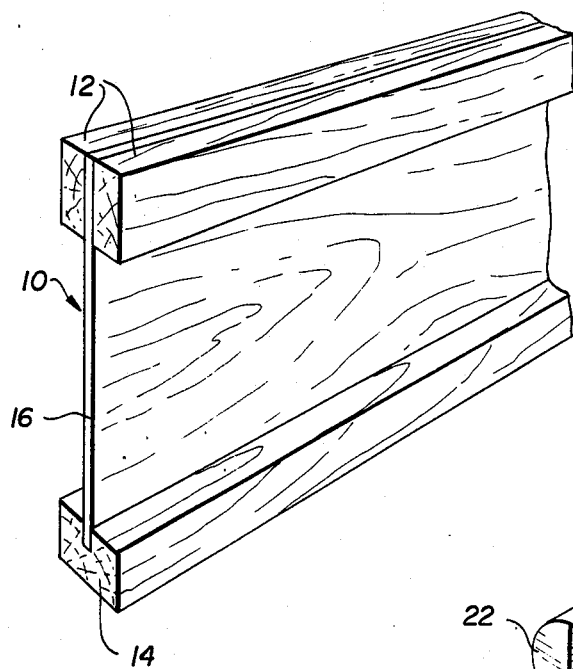
FIG. 1 is a perspective view of an I-beam in accordance with the invention.

Referring now to FIG. 1, there is shown a typical I-beam 10 which also illustrates the versatility of the invention. The I-beam is made up of a central web 16, and has a pair of side flanges 12 at its upper end and a single flange 14 formed with a groove to receive the lower edge of the web 16. Thus, FIG. 1 illustrates one facet of the versatility of the invention, that is, the different kinds of flanges with which I-beams according to the invention can be made.

As described above, the web 16 can be made of reconstituted materials such as plywood, particlewood and the like. The flanges 12 and 14 can be made of small dimension lumber, or other kinds of wood which may be available, as shown in FIGS. 2, 3 and 4.

Figure 2:
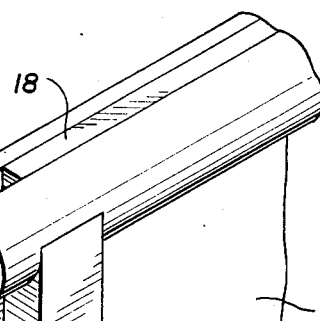
FIGS. 2, 3 and 4 are views similar to FIG. 1 showing variations of slotted I-beams prepared for cooperation with a mating component.
Figure 3:
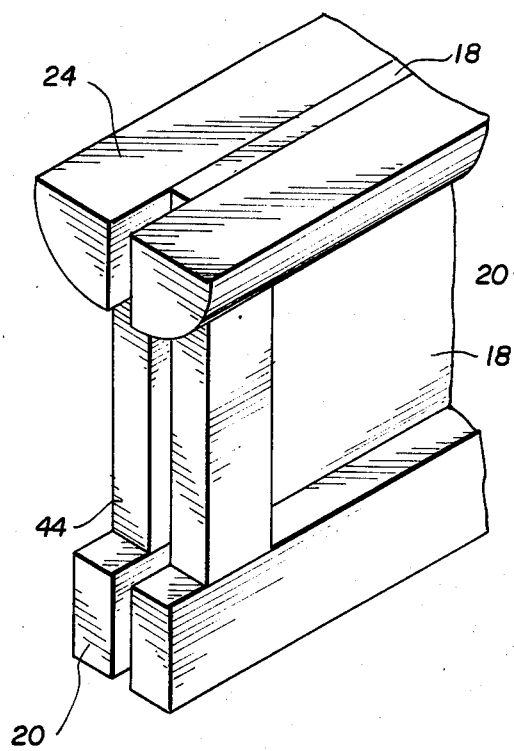
Figure 4:
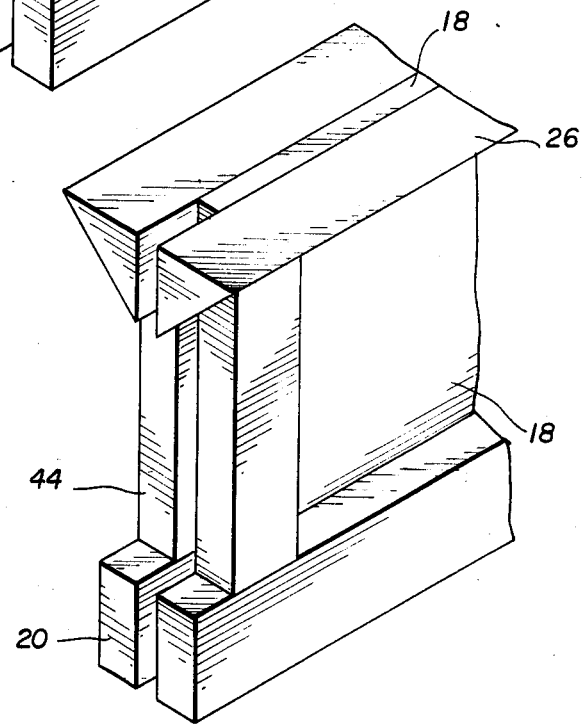

Referring to FIGS. 2, 3 and 4, further versatility in this regard is shown by the three different I-beam ends of the these three Figures. All include a central web 18 which for purposes of illustration is shown formed with a groove preparatory for fitting it to a mating member. Further, the lower ends of all three beams are shown with rectangular ends 20, again identical in all three Figures. In addition, these figures include a web stiffener 44 that is used to reinforce the webs at points of concentrated load such as where the column load from the wall is applied to the floor beam. Stiffener 44 also reinforces the joint where the webs of wall and floor components butt together.

The beam of FIG. 2 however has its upper flanges formed of half circular members 22, the beam of FIG. 3 uses quarter circular members 24, and the beam of FIG. 4 uses triangular shaped members 26. Thus, the versatility of the invention showing the different types of flanges which may be used is well illustrated in this family of three Figures. Other configurations are also possible, and even random shapes as would be produced by the use of scrap materials, and other marginal materials can also be utilized in the invention system.

Figure 5:
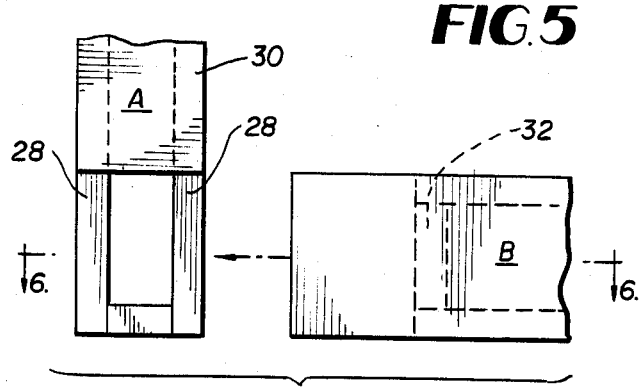
FIGS. 5 and 6 are companion views of a schematic representation of a typical joint of the box beam alternative of the invention before it is joined together, FIG. 6 being a schematic cross-sectional view taken on line 6—6 of FIG. 5.
Figure 6:
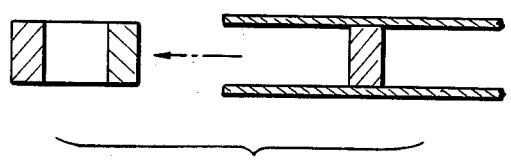
Figure 7:
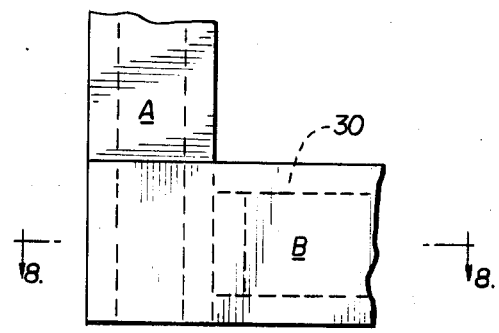
FIGS. 7 and 8 are a companion similar set of views showing the same idealized box beams of FIGS. 5 and 6 in the joined together condition, FIG. 8 being a cross-sectional view taken on line 8—8 of FIG. 7.
Figure 8:
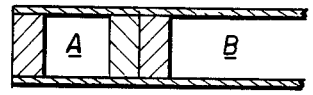

FIGS. 5–8 are a family of drawings showing the manner in which box beams built in accordance with the teachings of the invention are joined together. The drawings are somewhat stylized, and illustrate a box beam A being joined to a box beam B. The two beams, A and B are similar in construction, and each comprises a pair of flanges 28 joined together by side walls 30. FIGS. 5 and 6 show the joint before it is made, and FIGS. 7 and 8 afterwards. The box beams A and B can be readily produced in a simple workshop and nailed or nailed/glued manually. In order to be modified for use in the invention, the side plates 30 of the beam A have been cut away along their length a distance substantially equal to the height of beam B, and the flanges of the beam B have been cut away along their length a distance substantially equal to the height of beam A and an end member 32 inserted at this junction. This permits the final connection as illustrated in FIGS. 7 and 8, with the continuity of the flanges and side walls through the joint. The beams A and B are joined together in any conventional manner such as by gluing, nailing, screwing or the like.

Figure 10:
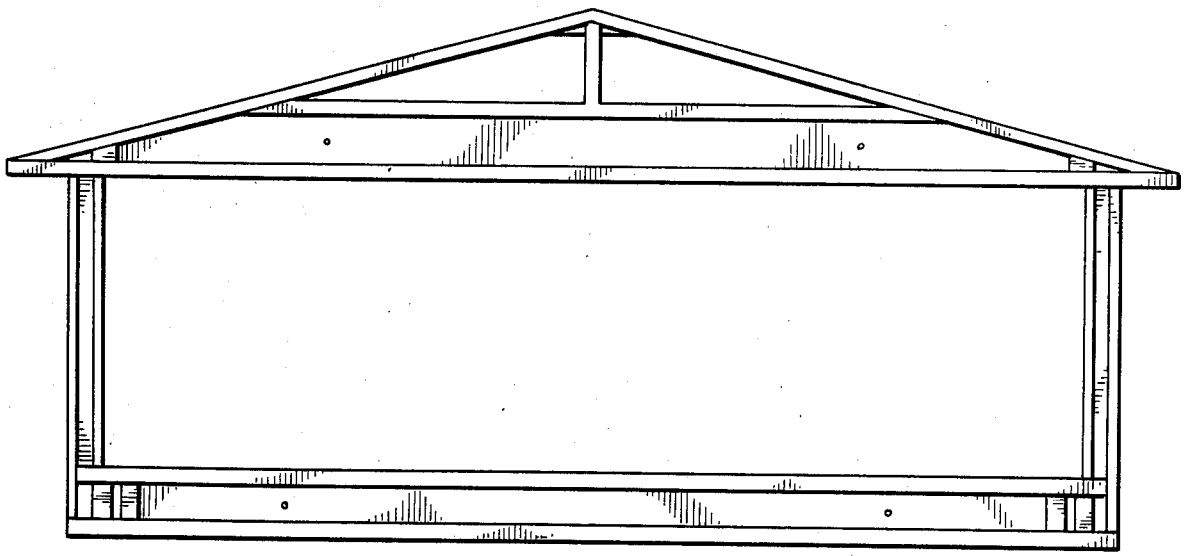
FIG. 10 is a view similar to FIG. 9 showing the parts in the assembled together condition.

FIGS. 9–16 illustrate the teaching of the invention as applied to residential or light frame construction in general. Each vertical section is made up of a floor beam 34, a left side wall beam 36, a right side wall beam 38, and a ceiling and roof combination beam 40. FIG. 10 shows the four elements joined together to form one vertical section through the house.

As is well known to those skilled in the construction industry, a suitable foundation to support the floor beams 34 will be provided.

FIG. 11 shows a sequence of vertical frames being assembled to frame out the entire building. Reference numeral 42 indicates spacer blocks which are put between each vertical section in order to serve as nailer and to provide structural integrity for the entire building. Other such blocks will be provided as needed, as is well known to those skilled in these arts.

Figure 12:
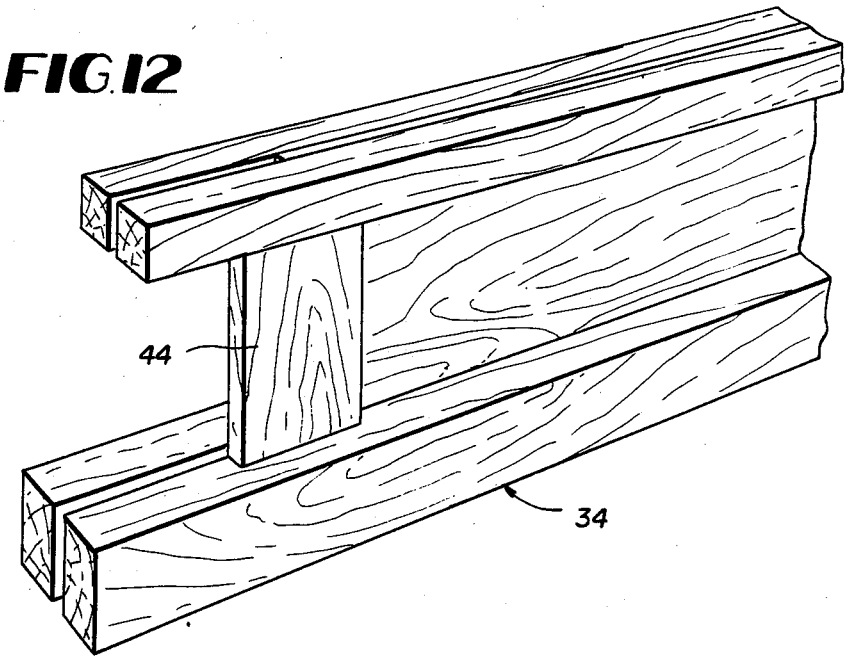
FIG. 12 is an end view of the floor beam used in FIGS. 9–11.
Figure 9:
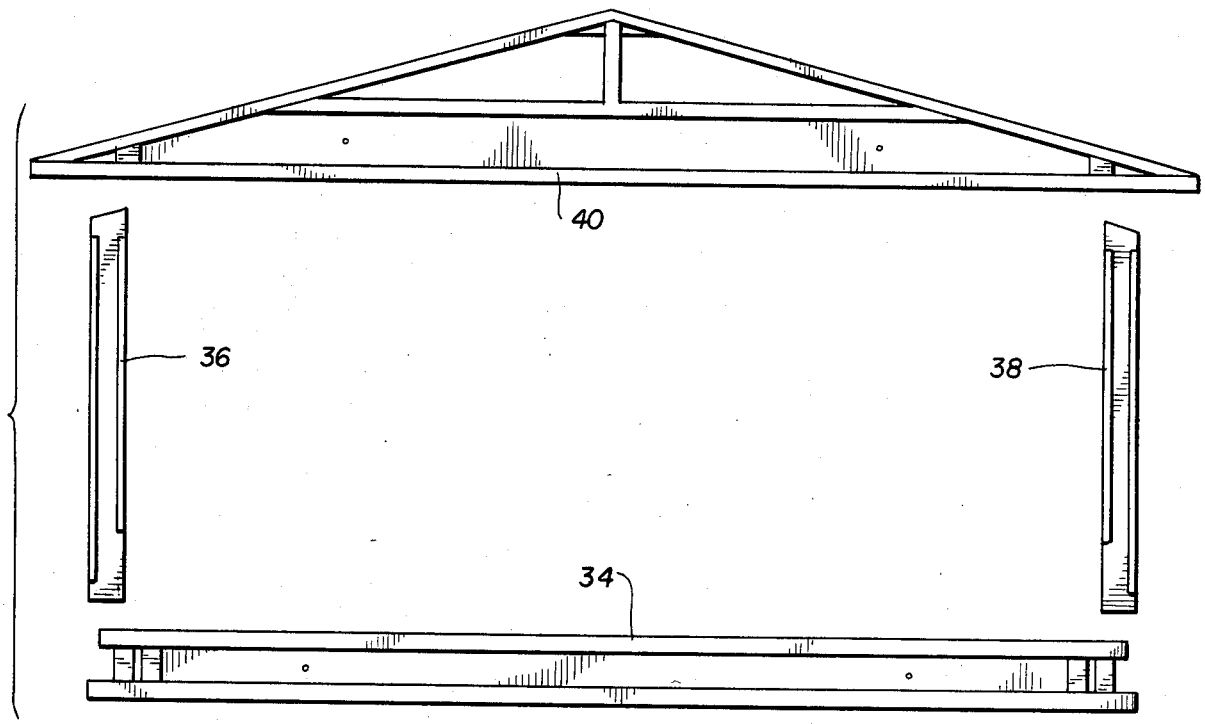
FIG. 9 is an exploded view of a vertical section through a building being built in accordance with the invention system.

FIG. 12 shows the floor beam in greater detail. It is in accordance with the teachings as thus far described comprising a web and flanges. In addition, the flanges are of square cross section at the upper end and are of rectangular cross section at the lower end, but these parameters are of course variable. A web stiffener 44, previously described in connection with FIGS. 2, 3 and 4, is provided for cooperation with the wall beams.

FIGS. 13 and 14 show the manner in which the upper end of the wall beams are joined to the roof 40, in this case it is the left wall beam 36 whose upper web end 46 fits into a pocket 48 formed in the roof member 40. The provision of this pocket 48 which cooperates snuggly with the web end of the upper end of the wall beams provides structural continuity and great strength at the juncture of the walls and the roof.

Figure 15:
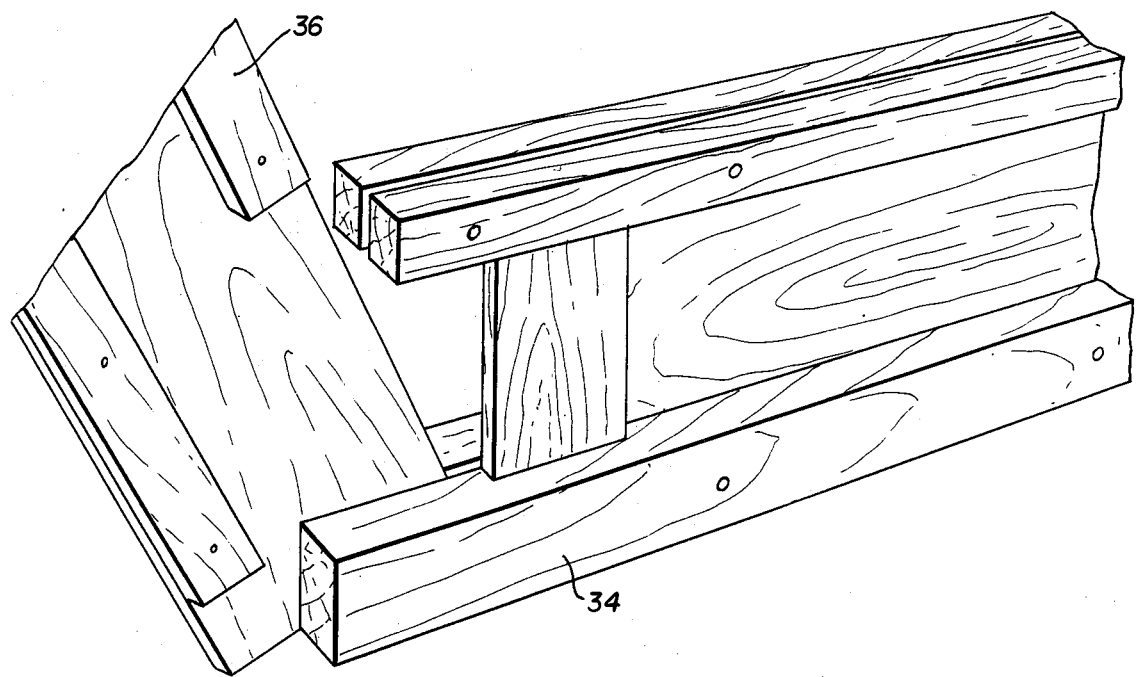
FIG. 15 is a perspective view showing the joining together of the wall and the floor of the construction of FIGS. 9–11.
Figure 16:
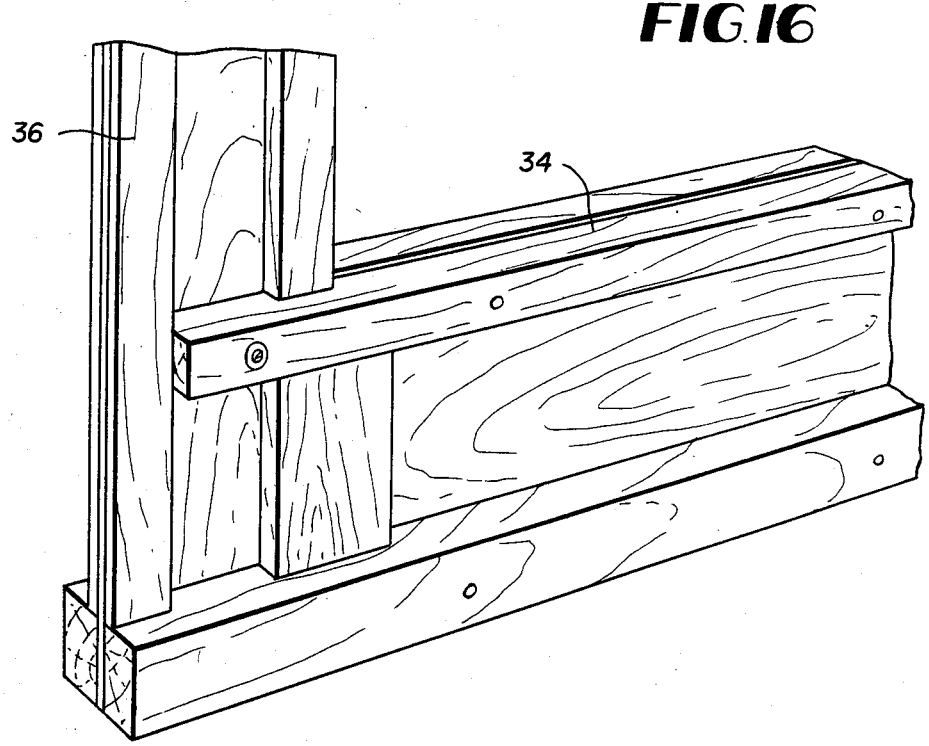
FIG. 16 is a view similar to FIG. 15 showing the parts in their assembled together condition.

FIGS. 15 and 16 are views similar to FIGS. 13 and 14 except that they show the manner of assembly of the lower end of the wall beams, in this case again, the left wall beam 36 to the floor beam 34. Again, the flanges and webs are cut away on the respective beams in order to permit, after assembly as shown in FIG. 16, continuity around the joint between the webs and the flanges. After securing in a conventional manner, the joint will have great structural integrity.

Referring now to FIGS. 17-20, a variation wherein certain of the flanges are slotted is shown in detail. This variation increases the strength of the joint formed in accordance with the invention.

Figure 17:
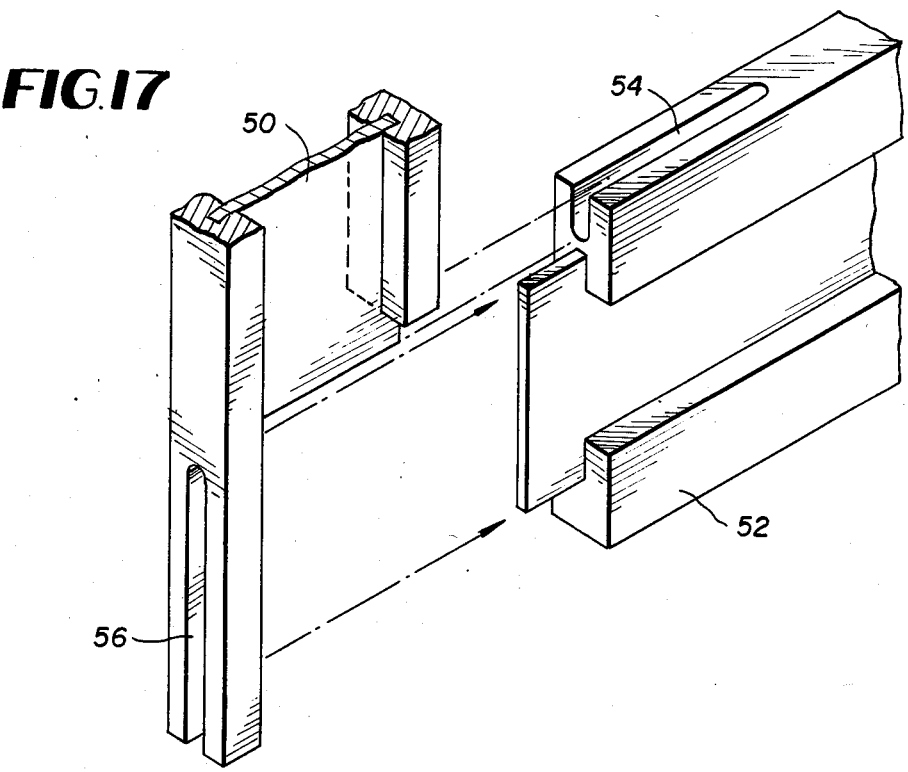
FIG. 17 is a perspective view showing two members being joined together according to a modified form of the invention.

Referring to FIG. 17, a vertical member 50 is shown joined to a horizontal member 52. The upper flange of I-beam 52 is formed with a groove 54 and a groove 56 is formed in the outer flange of vertical member 50. As is clear from the dotted line showing, the extending web of the vertical beam 50 will fit into the groove 54 and the extending web of the beam 52 will fit into the groove 56 of the beam 50. In this manner, after joining in the conventional way, the strength of the joint formed by the beams 50 and 52 will be enhanced.

Figure 18:
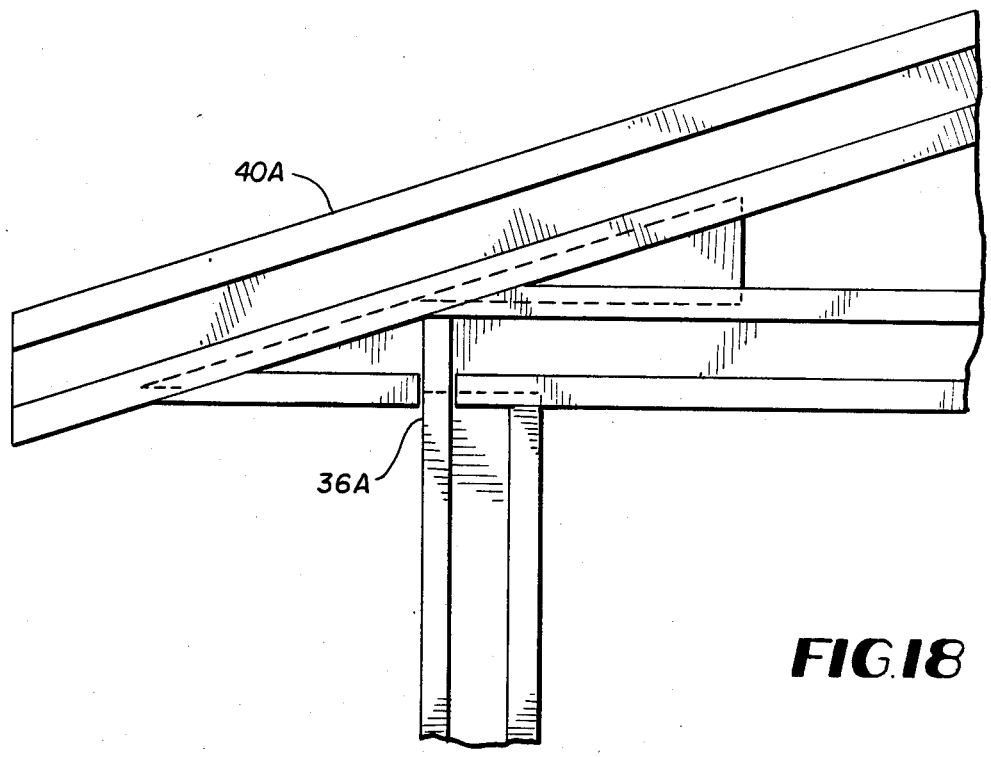
FIG. 18 is a showing of a wall and ceiling joint according to the modified version of FIG. 17.

A similar showing is presented in FIG. 18 between a roof member 40A analogous to the roof member described below, and a left side wall member 36A. The shaded portions indicate the grooves with the webs extending therein formed in the various members to enhance the strength of the wall to roof connection.

Figure 19:
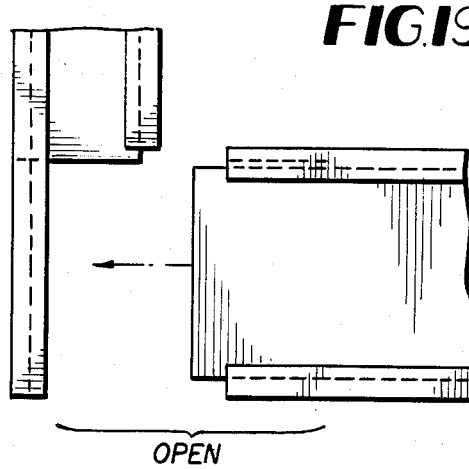
FIG. 19 is an exploded view showing an idealized joining together of parts in accordance with the embodiment of FIG. 17.
Figure 20:
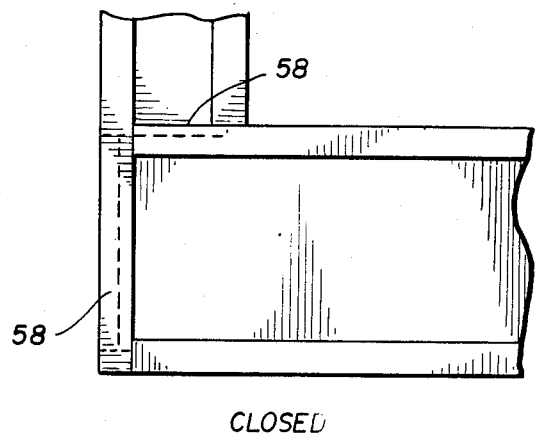
FIG. 20 is a view similar to FIG. 19 showing the parts in their joined together condition.

FIGS. 19 and 20 are concept drawings to show this variation of the invention in general terms. FIG. 19 shows the beams before joining and FIG. 20 shows the beams after joining and the shaded areas 58 in FIG. 20 show those locations where a web is being received in the groove in a flange.

Figure 21:
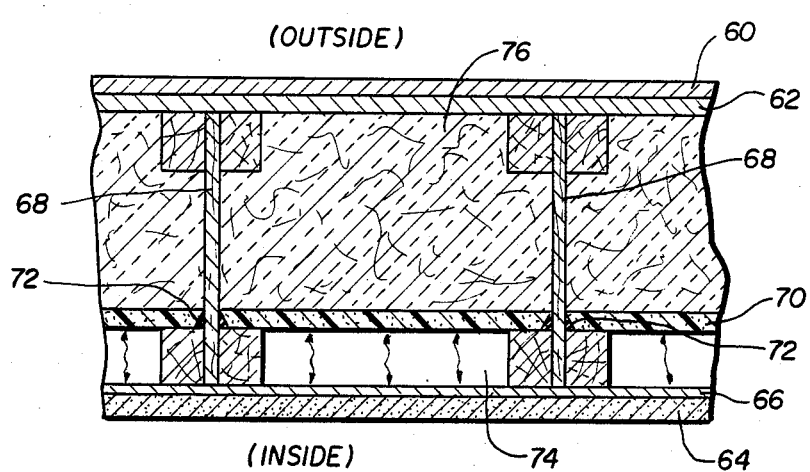
FIG. 21 is a horizontal sectional view in idealized form illustrating the manner in which a super insulated wall utilizing the teachings of the invention can be produced.
Figure 22:
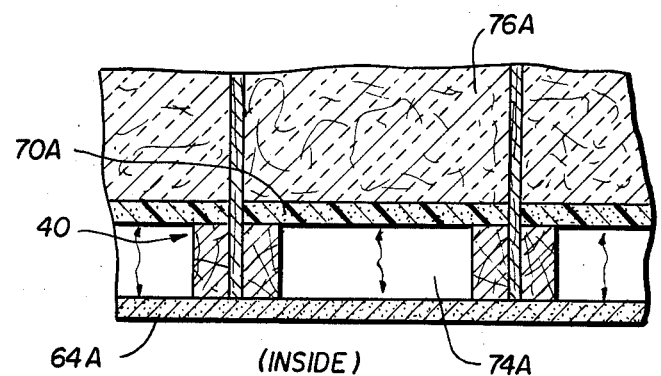
FIG. 22 is a view similar to FIG. 21 but showing an idealized vertical section through a ceiling member built in accordance with the invention teaching as to the super insulated variations.

FIGS. 21 and 22 illustrate the use of the invention system in fabricating super insulated walls. FIG. 21 is a horizontal section through a wall in somewhat idealized form and FIG. 22 is a similar idealized showing of a generally vertical section taken through a celing using this facet of the invention teaching.

Referring first to FIG. 21, the super insulated wall embodiment, the wall comprises an outer layer 60 which may comprise wood siding or any other external sheathing material. Under this is a layer 62 of conventional fiberboard usually ½" thick.

At the inside of the wall, the innermost layer is drywall or a gypsum board 64 which is supported by a hardboard structural sheathing 66.

Between the inner layers 62 and 66 are the structural members in the form of I-beams 68 which may correspond quite closely to the I-beams described above and shown in FIGS. 1-4, for example. The boards or layers 62 and 66 are secured to the flanges of the I-beams 68. These I-beams take the place of conventional solid wood wall studs as are used in conventional stick-by-stick construction.

On the inside surface of the wall, there is provided a conventional board 70 of foamed plastic which rests on the insides of the flanges of the beams 68 on the inside wall surface thereof. Conventional caulking 72 is provided to hold the foam boards in place on the insides of the I-beams 68 as shown. This automatically creates a dead air space 74 on the inside of the wall where it can do the most good. In addition, the foam boards 70 may also include reflective surfaces which also aid in providing insulating qualities to the wall.

Finally, the remaining spaces between each pair of I-beams 68 and between the boards 70 and the outside sheathing supports 62 is filled by blankets of fiberglass or the like insulating material indicated at 76.

In this manner, there is provided a truly super insulating wall. It is estimated that the R value of such a wall will be in excess of 30.

FIG. 22 shows the same concepts as applied to a ceiling. The same parts as described above in regard to FIG. 21 are indicated by the same reference numerals followed by "A." Another difference in ceiling construction is that instead of blankets or batts of insulation 76 or 76A, loose fill can be used as is conventional in ceiling insulation.

While the invention has been described in detail above, it is to be understood that this detailed description is by way of example only, that other construction materials such as light gage metal and fiber furnish (e.g., sugar rinds) might be used, and the protection granted is to be limited only within the spirit of the invention and the scope of the following claims.

I claim

1. A vertical rectilinear frame for a building comprising a floor beam, right and left wall beams, and a roof beam, said floor, wall and roof beams forming a joint at each of the four junctions of said floor, wall and roof beams, wherein said beams are interlocked at each joint to form a unitized frame having structural continuity among all its beams, whereby said vertical frame functionally comprises a single high strength structural component of said building, each of said beams comprising a web and a plurality of flanges, wherein each of said wall beams at the interlock joint with said roof beam includes a web segment which longitudinally extends beyond its flanges to define an extended web segment, wherein said extended web segment is connected to said roof beams flanges in slots therein, wherein said extended web segment is coplanar and at least nearly butting with said roof beam's web,
 wherein one beam of each pair of the interlocking beams at the floor-wall joints includes a web segment which longitudinally extends beyond at least one flange of said one beam to define an extended web segment on said one beam, wherein said extended web segment on said one beam is connected to at least one flange of the other beam of said pair, wherein said connection is at points across said segment's substantially entire width, wherein said extended web segment on said one beam is coplanar and at least nearly butting with said other beam's web.

2. The frame of claim 1, wherein said joint as formed at the junction of a wall beam and said roof beam includes a pocket-like structure formed in said roof beam to receive said extended web segment of said wall beam in said pocket-like structure.

3. The frame of claim 2 wherein said extended web segment of said one beam of the pair of interlocking beams at the floor-wall joint extends beyond all flanges on said one beam, wherein at least one beam of said pair has flanges of unequal length so that there is a shorter and longer flange thereon, wherein said shorter flange butts against one flange of its opposite beam, wherein said longer flange is butted by said one flange of its opposite beam.

4. The frame of claim 3 wherein said extended web segment of said one beam, and said shorter and longer flanges are on the same beam.

5. The frame of claim 3 wherein said extended web segment of said one beam is on a different beam than the beam having shorter and longer flanges.

6. The frame of claim 4 wherein said extended web segment on said one beam is connected to two flanges, in slots therein, on its opposite beam.

7. The frame of claim 5 wherein said extended web segment on said one beam is connected to only one flange, in a slot therein, on its opposite beam.

8. The frame of claim 6 wherein there are flanges of unequal length on both beams of each pair at the floor-wall joints, wherein said shorter flange in claim 3 butts against its opposite beam's shorter flange, wherein said longer flange of claim 3 butts against its opposite beam's longer flange.

9. The frame of claim 7 wherein the beam having shorter and longer flanges has a web segment which extends beyond its shorter flange, but not as far as its longer flange, wherein the part of said latter segment which extends beyond its shorter flange is connected to a flange on its opposite beam in a groove in said latter flange.

10. The frame of claim 9 wherein the beam having a web segment which extends beyond all of its flanges has flanges of equal length which butt against said longer flange, while said shorter flange butts against one of said flanges of equal length.

11. The frame of claim 3 wherein all of said beams are I-beams fabricated of wood.

12. The frame of claim 8 wherein all of said beams are I-beams fabricated of wood.

13. The frame of claim 10 wherein all of said beams are I-beams fabricated of wood.

14. A joint formed of first and second members perpendicular to one another, each of said members comprising at least one web and a plurality of flanges, wherein part of said first member's web segment longitudinally extends beyond its flanges at said joint to define an extended web segment, wherein said second member has flanges of unequal length so that there is a longer and a shorter flange thereon, wherein said second member has a web segment which extends beyond its shorter flange but not as far as its longer flange, wherein said first member's extended web segment is connected to said second member's longer flange in a slot therein, wherein said connection is at points across said segment's substantially entire width, wherein said first member's extended web segment is coplanar and at least nearly butting with said second member's web, wherein the width of said first member's extended web segment is about the width of said first member's web, wherein said second member's extended web segment is connected to a flange on said first member in a groove in said latter flange, wherein said second member's shorter flange butts against one flange on said first member, wherein said second member's longer flange is butted by said one flange of said first member.

15. The joint of claim 14 wherein the member having a web segment which extends beyond both of its flanges has flanges of equal length both of which butt against said longer flange.

16. The joint of claim 15 wherein said members are I-beams fabricated of wood.

17. The joint of claim 16 wherein said joint is a wall-floor joint in a frame for a building.

* * * * *